Sept. 5, 1939.　　　　　H. D. MINICH　　　　　2,171,591
BRUSH
Original Filed Sept. 5, 1935　　2 Sheets-Sheet 1
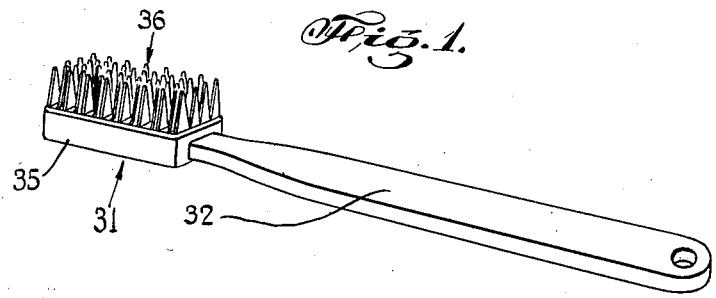
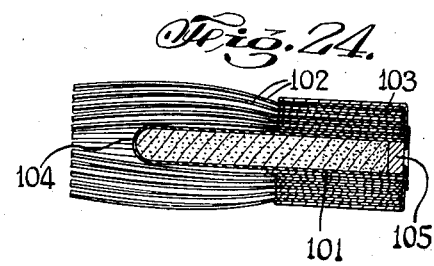
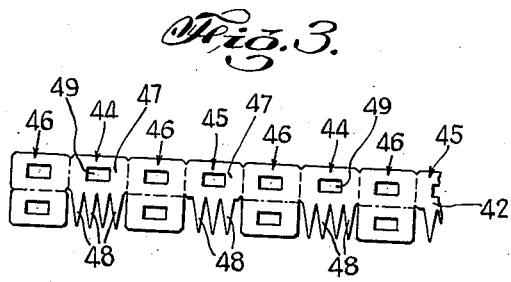
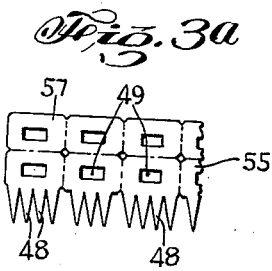
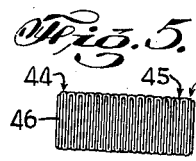
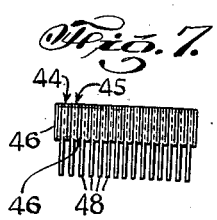
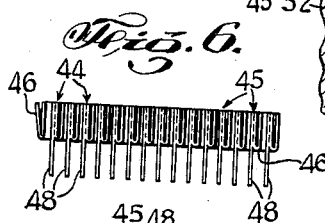
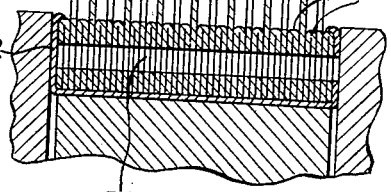
INVENTOR
HENRY D. MINICH
BY S M Pineles
ATTORNEY Sept. 5, 1939.  H. D. MINICH  2,171,591
BRUSH
Original Filed Sept. 5, 1935   2 Sheets-Sheet 2
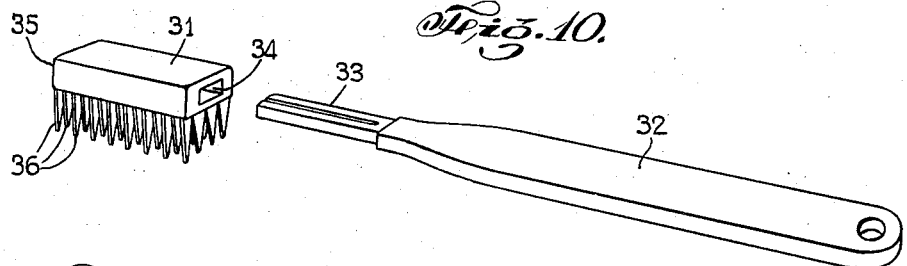
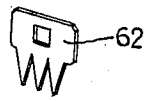
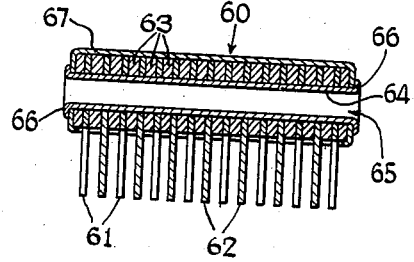
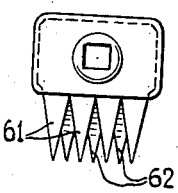
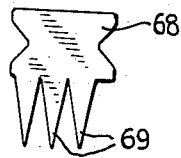
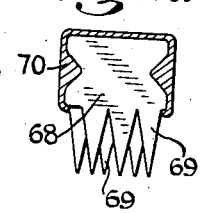
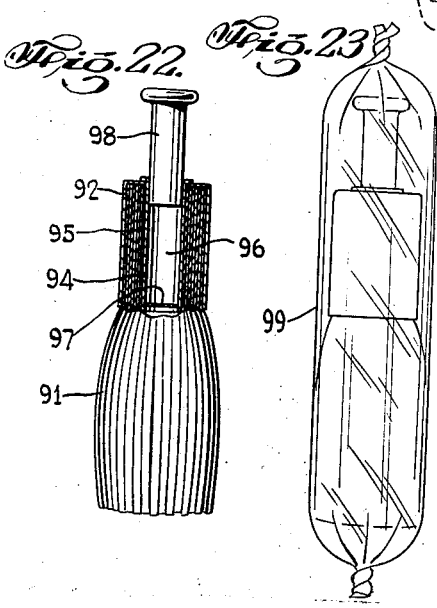
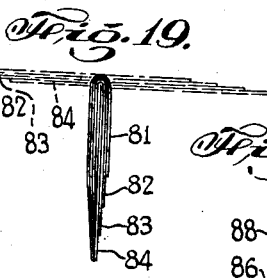
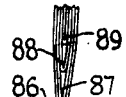
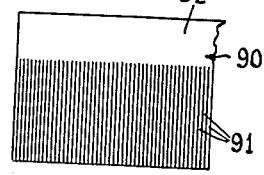
INVENTOR
HENRY D. MINICH
BY S M Prieles
ATTORNEY Patented Sept. 5, 1939

2,171,591

UNITED STATES PATENT OFFICE 2,171,591

BRUSH

Henry D. Minich, North Tarrytown, N. Y.

Application September 5, 1935, Serial No. 39,226
Renewed November 29, 1938

4 Claims. (Cl. 300—21)

This invention relates to brushes and it has among its objects brushes with bristles or hair of a solid rubber hydrohalide compound out of which bristles and hairs of any normally required stiffness may be made at a fraction of the cost of the natural bristles and hairs generally used in similar brushes.

A particular object of the invention is such improved tooth brushes with stiff moisture-proof bristles of a strong, homogeneous material.

The features and objects of the invention will be best understood from the following description of exemplifications thereof, reference being had to the accompanying drawings, wherein Fig. 1 is a view of an assembled tooth brush embodying the invention;

Fig. 2 is a cross sectional view of laminated sheets for the brush bristles;

Fig. 3 is a bristle strip for the brush;

Fig. 3a shows another modified form of bristle strip;

Figs. 4 and 5 are plan views and Figs. 6 and 7 corresponding vertical elevational views illustrating the successive steps of the formation of the brush out of the strip of Fig. 3;

Fig. 8 is a vertical sectional view of the brush held in a forming die;

Fig. 9 is an end view of the brush of Fig. 8 after removal from the die;

Fig. 10 is a perspective view of the completed brush with the detachable handle;

Figs. 11, 12 and 13 are perspective views of elements of a modified brush;

Fig. 14 is a vertical sectional view and Fig. 15 is an elevational end view of a brush made of the elements of Figs. 11 to 13;

Fig. 16 is a plan view of another form of bristle element;

Fig. 17 is an end view of a tooth brush, with a handle shown in cross section, of a brush with bristle elements of Fig. 16;

Fig. 18 is a partially sectional view of a brush unit combined with a finger stall;

Figs. 19 and 20 are cross sectional views of modified lamination strips for bristle elements of the invention;

Fig. 21 is a plan view of a modified form of bristle strip;

Fig. 22 is a vertical sectional view through a shaving brush made of a lamination strip of Fig. 21;

Fig. 23 is an elevational view of an encased brush unit shown in Fig. 22; and

Fig. 24 is a vertical sectional view of another form of shaving brush.

Satisfactory tooth brushes must have moisture-proof, relatively stiff bristles of a shape suitable for penetration into the cavities between the teeth and massaging the gums. Heretofore such brushes had to be made of high grade imported hog bristles which are difficult to obtain and are costly. Accordingly, such brushes are repeatedly used for relatively long periods of time and have to be left exposed for drying, subjecting the bristles to contamination, breakage and deterioration.

Flexible transparent sheet material composed of rubber derivatives containing chlorine or another halide made by subjecting crude rubber to a reaction with a hydrohalide are well-known in the art and have been commercially available for some time. Such material is moisture-proof, has great tear resistance, a high stretch limit, is not affected by humidity, oil or grease. Such material is marketed by The Goodyear Tire and Rubber Company, of Akron, Ohio, in the form of transparent or opaque colored sheets 1 to 1.4 mil thick under the name "Pliofilm". Sheet material of such rubber hydrohalide compound has a high tear resistance and can be stretched to a substantial extent without tearing it. It is not affected by changes in humidity nor by oil or grease. It has also a great shock resistance and bristles made of this material do not break as easily as ordinary bristles. I have found that such material may be utilized for making novel brushes which have the desirable characteristics of expensive high-grade brushes made of natural bristles and hair, such as the hog bristles or badger hair at a fraction of their cost, but superior to such expensive available brushes in being able to resist wear, breakage and the action of humidity, oil and grease.

A tooth brush exemplifying the invention is shown in Figs. 1 and 10 of the drawings. It comprises a brush body 31 with a detachable handle 32 having a forked end 33 which has a tight press fit in an oblong perforation 34 of the base 35 of the brush body.

The brush body 31 with its base 35 and its bristles 36 is made of a lamination, such as shown in Fig. 2, consisting of a plurality of superimposed sheets 40 about 1 to 2 mils thick of the rubber hydrochloride compound. Four or more layers of this material, depending on the desired thickness of the bristles, are placed on the top of each other and solidified into a single lamination. This solidification is effected by applying pressure to the superimposed sheet layers between two pressure platens heated to a temperature of about 260° Fahrenheit. Depending on the thickness of the lamination, a pressure of about 2 to 10 pounds per square inch at a temperature of about 200° to 300° Fahrenheit is applied to the sheets for a few minutes until the individual sheets are fused into one homogeneous lamination. Laminations varying in thickness between 2 to 3 up to 10 to 20 or more mils are thus readily produced.

Such sheets may also be homogenized or fused into a single lamination by passing the superimposed sheets between two rotating cylindrical pressure rolls heated to the required temperature, the speed of the movement being adjusted so as to maintain the temperature of the individual sheets at a value at which they fuse under the applied pressure.

In carrying on the foregoing process of fusing a plurality of sheets into a stiff, flexible lamination, the temperature of the individual sheets should be raised only to a value at which the adjacent sheet surfaces fuse under the applied pressure without turning the entire body of the individual sheets into a fusible mass. To secure stiff laminations, it is also desirable to cool the fused sheets as soon as they become fused into a lamination. This may be readily done by passing the fused lamination emerging from the heated pressure rolls through rolls maintained at a low temperature, thus quickly chilling the lamination.

The laminations so obtained have great stiffness and are suitable for the production of stiff brush bristles. Out of such lamination, having the desired thickness and stiffness, bristle strips 42, as shown in Fig. 3, are produced by a suitable forming die. The bristle strip 42 consists of a series of bristle elements 44, 45 with intervening spacer elements 46. Each bristle element has an oblong base portion 47 and tooth-shaped bristles 48, the teeth of the bristles of consecutive bristle elements 44, 45 being staggered relative to each other. The base portion of each bristle element has an oblong hole 49 which forms the perforation 34 of the brush body. Each spacer element 46 forms one or more duplicates of the base portion of each bristle element. By folding the spacer elements 46 over the base portions 47 of the bristle elements, spacers of suitable thickness are provided between the adjacent bristle elements.

The bristle strip 42 so formed has its elements folded in the way shown in Figs. 4 and 6 and assembled side by side in the way illustrated in Figs. 5 and 7. Thereupon the adjacent base portions 54 of the bristle elements and the interspersed spacers 46 are compressed in a suitably heated pressure die, as shown in Fig. 8, fusing the individual base portions of the bristle elements and the spacer elements into a unitary self-supporting brush structure holding the staggered rows of the bristles 48 projecting above the base in the way shown in Fig. 9. A layer 52 of the same fusible material may be placed around the pack of bristle elements shown in Fig. 5 and fused around the base portions thereof to form a smooth outer surface around the brush base.

The base 35 with the bristles 36 so produced form a rigid, homogeneous unit, the base 35 constituting a firm and strong support of the firm bristles projecting therefrom. The alignment of the bristles 48 transversely to the longitudinal axis of the base 35 permits efficient cleaning of the teeth by an up and down motion which is imparted to the brush by the detachable handle 31. The bristles of the tooth brush are thus homogeneously united with the body of the brush from which they project and cannot be broken like the hog bristles in ordinary brushes. The cleaning action obtained by such brush is in every respect at least as good as the cleaning action obtained with the expensive hog bristle brushes. Because of the cheapness of the material forming the brush and the simplicity of its manufacture, it may be thrown away after use notwithstanding that its efficiency as a brush is not impaired by its use and it will continue to clean teeth efficiently for at least the same length of time as the hog bristle brushes.

Such brushes may also be made in other ways, for instance, by using bristle strips 55 shown in Fig. 3a in which the spacer elements 57 form an edge portion of the bristle strip and are folded thereover before folding the strip into the brush stack.

In Figs. 14 and 15 is shown a further modification of such brush body 60 in which the separate bristle elements 61 and 62 and spacer elements 63, as shown in Figs. 11, 12 and 13, are assembled on a rivet-like tubular supporting member 64 which holds the individual elements of the brush body firmly clamped without fusing them to each other. Like in the brush shown in Fig. 10, the brush body 60 may be easily mounted on a handle having a forwardly projecting end fitting tightly into the cavity 65 of the rivet member 64. The rivet may be made either of sheet metal or of the same substance as the bristle material. Like in the brush shown in Fig. 9, the base of the brush may be enclosed in a wrapper 67 which is held clamped under the rivet heads 66, or the wrapper may be fused to the bristle elements by applying pressure to the walls of the base while heated to the temperature of fusion. Alternatively, all the bristle elements 61, 62, the spacer elements 63 and the wrapper 67 may be fused into a homogeneous unit like the brush of Fig. 10.

Instead of using two kinds of bristle elements 61 and 62 with staggered bristle projections as described in connection with the brush of Figs. 11 to 15, a single bristle unit 68 as shown in Fig. 16 may be used. This bristle element has bristle teeth 69 which are offset against its dovetailed base portion so that by placing one bristle element in backward position over the next bristle, the teeth of two adjacent bristles will be staggered relative to each other. The dovetailed base portion of each bristle element matches with the dovetailed portion of each other bristle element irrespective of the alignment of their bristle teeth so that they may be assembled into a brush body with staggered bristle teeth as shown in Fig. 17. The bristle elements are then fused into a homogeneous unit for detachable mounting on a handle 70 having a groove fitting the dovetailed brush base.

As shown in Fig. 18, such brush may also be provided with a finger stall 72 made of the same or some other suitable material so that the brush may be used without a handle.

As illustrated in Fig. 19, brushes of the invention may also be provided with bristles which are much stiffer at the base than at the outward ends. Several layers 81, 82, 83, 84 of rubber hydrogen chloride compound, cut in the form of strips having a width twice the height of a bristle element, superimposed upon each other in staggered relation and folded at the center into a flat strip, are fused into a homogeneous lamination strip that is relatively thick at one side and thin at the other side. From this strip, bristle elements thick at the base and thinner at the outward ends are punched and assembled into brushes like those shown in Fig. 10 or Fig. 14.

Alternatively, such bristle elements and brushes may be made out of lamination strips shown in Fig. 1 in which several strips 86, 87, 88, 89 of successively greater width are folded over each other and fused together into a lamination strip which is of relatively great stiffness at one side and of smaller stiffness at the opposite side.

In a similar way other types of brushes having soft resilient hair-like synthetic bristles, such as shaving brushes, superior in use to high grade hair brushes, may be made in accordance with the invention. To this end a lamination strip 90 of rubber hydrogen chloride material, as shown in Fig. 21, has one side thereof scored into narrow hair-like bristles 91, the other side 92 of the strip constituting the support for the hair-like bristles 91. These bristle strips are preferably formed of laminations, shown in Fig. 19 or Fig. 20, so that the individual bristles are relatively thick and stiff at their base and gradually decrease in thickness and stiffness toward their ends. The strip 90 is then wound around a cylindrical core 94 into a brush of the desired size, as shown in Fig. 22, a spacer strip 95 being interposed between the successive layers of the portion of the bristle strip forming the head of the brush. The several layers of the strip forming the base portion 92 of the brush of Fig. 22 may then be fused into a firm, rigid body by compression at the fusion temperature of the material. The core 94 may be either of metal or other suitable substance and is preferably made of several layers of the spacer strip 95 wound into a cylinder for supporting the succeeding bristle layers constituting the brush.

The hollow space inside the core 94 forms a compartment which may be filled with a shaving soap cream or powder. To this end the bottom opening of the compartment 96 is preferably sealed by an expellable thin film 97 of readily yielding material, to permit ready expelling of the cream or powder from the compartment 96 into the space between the bristles 91. The upper end of the cavity 96 may be provided with a piston-like button 98 which expels the cream or powder into the bristle space when pressed down into the compartment. The brush with the cream filling may be encased in a wrapper 99 as shown in Fig. 23 and form a cartridge-like unit, the wrapper being readily torn off when the brush is to be used. Tooth brush units of Figs. 10 and 14 may have the empty spaces between the bristles filled with tooth paste or powder and similarly enclosed in wrappers ready for use by tearing off the wrappers.

Similar flat or round paint brushes may be made by winding a laminated bristle strip, as shown in Fig. 21, into a flat or round unit, with or without spacers between the bristle strip layers, the base portion of the strip being fused into a rigid brush head which may be combined with a permanent handle by fusing it to the brush head.

In Fig. 24 is shown another form of shaving brush of my invention. Over a cylindrical hollow mandrel 91 wound of a portion of a lamination strip provided at the beginning of a bristle strip, such as shown in Figs. 19 to 21, is wound the main portion of the bristle strip 102, a narrower spacer strip 92 being interposed between the successive layers of the bristle strip as in the brush of Fig. 22. Alternatively, the mandrel 91 may be made of a portion of the spacer strip or in some other similar way. The several base portions of the layers forming the head of the brush are then fused into a firm unit in the way described above. Inside the hollow space of the mandrel 91 is placed a sack 104 of dissolvable paper or similar material holding powdered soap or another shaving powder, so that when the brush is wetted, the sack releases its contents between the brush bristles for application to the face of the user. A piston-like plug 105 of paper or cotton may be provided at the open rear end of the sack, serving to expel the contents of the sack, if this is necessary.

Various other types of brushes, such as hair brushes and clothes brushes, superior in utility to the high grade expensive brushes now in general use, may be made in accordance with the invention and thus brushes produced at a fraction of their cost.

Bristle brushes of the invention of the type described herein in which the brush body and the brush bristle consists of a coalesced thermoplastic derivative of crude rubber may also be made by subjecting such material to pressure of suitably shaped heated dies, preferably roller dies, which force the material into the desired brush-bristle shape while it is in a slightly plastic state.

The invention is likewise not limited to the particular method of producing the brushes described in the foregoing exemplifications thereof, since the bristle material used in the brushes of my invention may be compressed and extruded into bristles and processed in other ways as will suggest itself to those familiar with this material. Accordingly, I desire that the appended claims be given a broad construction commensurate with the scope of the invention.

I claim:

1. In the production of brushes, the process comprising, fusing by heating overlapping area portions of a plurality of sheets of a rubber hydrohalide compound to form a lamination, certain overlapping area portions of a series of adjacent sheets being of different length to provide at least one portion of tapered cross section, a series of said laminations into brush elements having a body portion and bristle-like projections extending from said body portion, fusing by heating a series of the body elements of said brush elements to form a brush head, and solidifying the brush head by lowering its temperature.

2. In a brush, a plurality of superposed sheet elements of a thermoplastic rubber hydrohalide compound constituting a substantially rigid brush head, and bristle-like projections extending from certain ones of the sheet elements of said brush head, the individual projections being formed of overlapping sheet element extensions of substantially different lengths coalesced to provide relatively stiff highly resilient bristle-like projections of tapered cross section.

3. In the production of brushes, the process comprising, fusing by heating overlapping area portions of a plurality of sheets of a rubber hydrohalide compound, each sheet having a thickness of the order of one mil to form a lamination, certain overlapping area portions of a series of adjacent sheets being of different length to provide at least one portion of tapered cross section, forming a series of said laminations into brush elements having a body portion and bristle-like projections extending from said body portion, fusing by heating a series of the body elements of said brush elements to form a brush head, and solidifying the brush head by lowering its temperature.

4. In a brush, a plurality of superposed sheet elements of a thermoplastic rubber hydrohalide compound having a thickness or the order of one mil constituting a substantially rigid brush head, and bristle-like projections extending from certain ones of the sheet elements of said brush head, the individual projections being formed of overlapping sheet element extensions of substantially different lengths coalesced to provide relatively stiff highly resilient bristle-like projections of tapered cross section.

HENRY D. MINICH.